TRANSMISSION CONTROL IN SIGNALING SYSTEM

Filed March 6, 1962 3 Sheets-Sheet 1

INVENTOR
M. B. GARDNER
BY C. E. Hirsch Jr.
ATTORNEY

INVENTOR
M. B. GARDNER
BY
A. E. Hirsch Jr.
ATTORNEY

April 7, 1964 M. B. GARDNER 3,128,353

TRANSMISSION CONTROL IN SIGNALING SYSTEM

Filed March 6, 1962 3 Sheets-Sheet 3

INVENTOR
M. B. GARDNER
BY
A. E. Hirsch Jr.
ATTORNEY

United States Patent Office 3,128,353
Patented Apr. 7, 1964

3,128,353
TRANSMISSION CONTROL IN SIGNALING SYSTEM

Mark B. Gardner, Chatham Township, Morris County, N.J., assignor to Bell Telephone Laboratories, Incorporated, New York, N.Y., a corporation of New York
Filed Mar. 6, 1962, Ser. No. 177,854
6 Claims. (Cl. 179—170.6)

This invention relates to signal wave transmission systems and particularly to signal-controlled means for suppressing echoes in such systems.

In two-way telephone circuits, it is common practice to interconnect local two-wire circuits, such as subscriber lines, by way of four-wire facilities which consist of two, unidirectional, two-wire circuits. At each two-wire to four-wire junction an arrangement known as a hybrid connects outgoing signals over one channel and accepts incoming signals from the other. In a long distance circuit with appreciable transmission time delay, the transition from the two undirectional paths to one bidirectional path normally gives rise to echoes or reflected transmissions. It is the usual practice to minimize such echo transmissions by means of signal-controlled apparatus which effectively disables one of the unidirectional paths while signal transmission is taking place over the other. Thus, echo signals are prevented from being transmitted back to the originating and causing either a disturbance or singing. The disabling apparatus usually comprises means, such as an amplifier-detector control circuit, for diverting a portion of the signal from one path and utilizing it to control the open circuiting or short circuiting of the oppositely directed path, or to control the operational characteristics of an amplifier or attenuator in the oppositely directed path.

Ordinarily, as the suppressor element in one path is actuated to prevent echo return, reply by the other subscriber tends to be locked out. In a differentially controlled variable loss echo suppressor, this situation is somewhat improved. Here, the amount of attenuation introduced in the return path is dependent on the magnitude of the speech signals present both at the transmit and the receive side of the terminal hybrid. With apparatus of this sort it is possible for either party to break into the conversation, i.e., to remove partially or fully the block in the transmission path, by raising the voice. However, since suppressor action is normally employed at both terminals, the removal of suppression at one end results in an increase in suppression at the other. There is thus a tendency for one subscriber to obtain more or less dominant control during periods of double talking. This is particularly objectionable for the combination of a weak and strong voiced subscriber or whenever, for any reason, one subscriber raises his voice significantly above that of the other. In either case, the way remains open for the louder talker to reach the far end at an unnecessarily high level at the expense of inadequate transmission in the opposite direction during periods of double talking.

Since normal speech is characterized by continuous fluctuations in the levels of the individual speech sounds, even a weak talker produces levels which momentarily are well above the low level speech sounds of the loud talker. The net result is that both talkers tend to interfere to a greater or lesser degree with normal transmission by the other during periods of double talking. Listening tests indicate, however, that when both are talking at essentially the same average over-all level, the interference over a differentially controlled variable loss system although noticeable, is not very objectionable. Maintenance of essentially the same over-all level at the inputs of the respective suppressor hybrids is not typical of most telephone conversations. The principal contributing factors to inequality are: (1) unequal talking levels by subscribers, and (2) the likelihood of unequal attenuations in the terminating two-wire circuits.

One way of minimizing the effects of these inqualities involving limiting, at each terminal, the level of the signal which arrives on the incoming line before it is imposed on the differential circuit which controls the suppressor element on the outgoing line. Thus, an above normal signal received from a distant station is prevented from reaching the differential control circuit in full, whereas above normal signals from the local subscriber station are supplied to the circuit without restrictions. Even if the remote subscriber further raises his voice, for example, as the local subscriber attempts to break in, his signal reaches the control point of the differential circuit only at the prescribed maximum level. Hence, the loss that the distant loud talker can introduce in the local transmit circuit is limited and lock out of normal level speech signals is virtually eliminated.

Under unfavorable noise conditions, however, such a restriction of signal levels transmitted to the connecting two-wire subscriber lines is not desirable. In a noisy environment, for example, it is usual for a subscriber to raise his voice and, although this is a desirable operating condition, it is not possible to take advantage of the increased talking level with the limiting arrangement discussed above.

It is accordingly a primary object of the present invention to improve the operation of a long two-way signaling system employing signal controlled apparatus for suppressing echoes and preventing singing.

It is a further object to improve the operation of a two-way signaling system employing echo suppressor apparatus under unfavorable noise conditions.

It is still another object of the invention to increase the ease of break-in in a two-way signaling system equipped with echo suppressors.

These and other objects are attained in accordance with the present invention by tailoring the over-all limiting characteristic closely to the momentary circuit conditions so that the range of control of a differential circuit or the like may vary to accommodate the generally higher talking levels which normally occur in a noisy environment. Basically, in accordance with the present invention, the noise-free power delivering capacity of the limiter is increased as a function of increasing noise level without, however, any appreciable alteration of the over-all gain of the system (hybrid in two hybrid out). Thus, gain adjustments of the system are not significantly disturbed. In the absence of noise, received signals are limited in their effect on the differential control circuit, and in the presence of noise received signals are similarly limited but at a somewhat higher level.

The invention will be fully apprehended from the following detailed description of an illustrative embodiment thereof, taken in connection with the appended drawings in which.

In the interests of simplicity, the circuit diagrams to be discussed are presented, for the most part, in block schematic form, with single-line paths which direct the flow of energy and information to the several apparatus components which process it. This rule is departed from in a few individual instances where the inclusion of electric input terminals and output terminals appears to add to the clarity of the exposition. It is to be understood that, in practice, each single-line energy path will normally be actualized with two electric conductors, one of which may in many cases be connected to ground.

Figure 1:
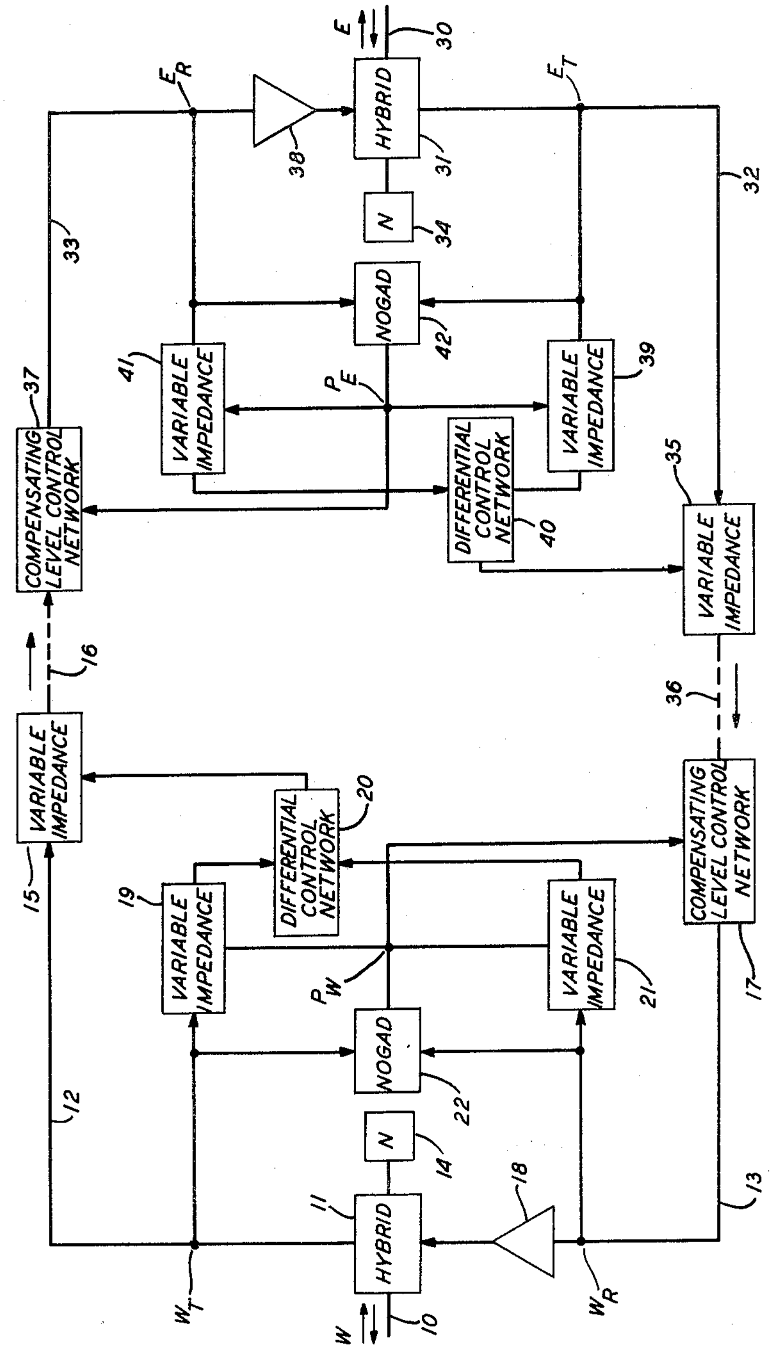
FIG. 1 is a block schematic diagram showing a two-way signal transmission system which utilizes a compensating level adjusting device for improving echo suppressor performance in accordance with the present invention.

FIG. 1 illustrates by way of a greatly simplified diagram, a signal transmission system interconnecting two terminal stations designated respectively E (east) and W (west). Two-way transmission is carried out in the following manner. A local circuit 10, which typically is a conventional two-wire telephone circuit connecting a subscriber to station W, is connected by hybrid network 11 to one end of a four-wire system that includes two separate two-wire circuits 12 and 13. In well known fashion, the hybrid network provides a one-way path for voice currents from circuit 10 to outgoing circuit 12 and another one-way path for incoming currents from circuit 13 to local circuit 10. The impedance of the local circuit 10 is matched insofar as practical by a balancing network 14 associated with hybrid 11.

Outgoing currents in circuit 12 are passed by way of a variable impedance 15 to the west-to-east transmission circuit 16 which may be of any desired sort. In the typical long distance circuit case, the transmission circuit represents appreciable time delay. At the east station, currents from circuit 16 are delivered to compensating level control network 37 and then by way of circuit 33 and isolating amplifier 38 to hybrid network 31. Hybrid 31, terminated by network 34, transfers incoming signal currents from circuit 33 to subscriber circuit 30 and routes locally generated signals from circuit 30 to outgoing circuit 32. Output currents are passed by way of variable impedance 35 to east-to-west circuit 36 and to station W. Signal currents received at station W are delivered to compensating level control network 17 and then by way of circuit 13 and receive amplifier 18 to hybrid 11.

Figure 5:
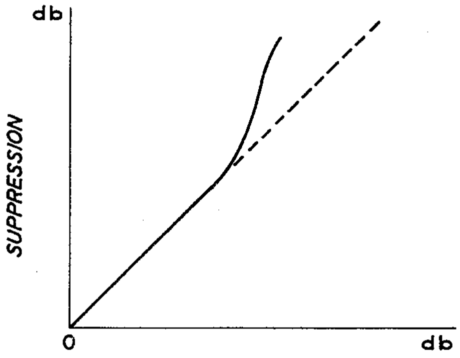
FIG. 5 illustrates the nonlinear character of the tandem variolossers employed in the apparatus of FIG. 2.

Ideally, all incoming currents are passed to the subscriber line; none is transferred to the outgoing circuit. Unfortunately, in actual practice, the balancing network, e.g., 14, provides only a partial match to line 10 and a portion of the incoming wave reaches line 12. In the absence of suppression, this portion is returned to the remote station as echo. Depending on its magnitude and on the amount of delay (round trip transmission time), the echo may be of considerable annoyance to the talking subscriber. In addition, echo currents tend to circulate repeatedly around the loop, and, if of sufficient magnitude, cause still further annoyance to both subscribers. Accordingly, echo suppressor apparatus is included in the transmission system. In the system illustrated, it includes variable impedance 15 in signal path 12, variable impedance 35 in signal path 32, and the associated control apparatus. Variable impedances 15 and 35 may be variable gain amplifiers, variolossers or switching elements designed effectively to open circuit or short circuit the signal path to any desired degree in response to external stimulus. A nonlinear suppression characteristic such as that shown by FIG. 5 is generally preferred to provide fairly rapid switching action at low levels and somewhat slower switching action at higher levels where audible amounts of transient energy are most likely to be generated by a too rapid switching action.

An outgoing signal from station W via path 12 ordinarily passes without attenuation through impedance 15 directly to W-E circuit 16. Part of the outgoing signal, however, is passed by way of variable impedance 19 to differential control network 20 where it is compared in magnitude with the incoming signal which appears at $W_R$ in circuit 13 and passed by way of variable impedance 21 to the differential control network. Differential network 20, which may be of any desired construction, develops an output signal whose magnitude is proportional to the differential between the two applied signals and which is suitable for altering the transmission chartacteristic of variable impedance 15. Hence, if the received signal, e.g., the signal that appears at point $W_R$ at the west station is sufficiently greater in magnitude than the outgoing signal at point $W_T$ in circuit 12, a signal is developed by differential circuit 20 which substantially increases the impedance of suppressor element 15 thus effectively to block W-E transmission. If, on the other hand, the momentary signal at point $W_T$ is sufficiently greater, the signal developed by differential control network 20 causes the impedance of suppressor element 15 to decrease and allow unrestricted W-E transmission. For the intermediate condition, when signals arrive at point $W_T$ simultaneously from both subscribers, the degree of suppression introduced in circuit 12 by variable impedance 15 is dependent on the ratio of the signal level at $W_T$ to that at $W_R$.

It might appear from the above that simultaneous transmission in both directions, at or near normal line level, would result as both subscribers increase their talking levels moderately. However, it should be noted that differential action occurs at both terminals. Hence, any decrease in the loss introduced by one suppressor results in an increase in the level transmitted to the opposite terminal. This acts in turn to increase the loss in the suppressor at the other end which in turn decreases the level which is transmitted back. Thus, the way remains open for a loud talker to reach the far end at an unnecessarily high level at the expense of inadequate transmission in the opposite direction during these periods even though the weaker talker may be talking at normal level.

This difficulty is overcome in the present invention by preventing the signal level at point $W_R$ in receive circuit 13 (and similarly the level at point $E_R$ in receive circuit 33 at the east terminal) from exceeding a selected normal level. No such restriction is imposed on signals reaching points $W_T$ and $E_T$ in the transmit circuits 12 and 32. As a result, a normal level speech signal reaching point $W_T$ or $E_T$ does not undergo more than a normal degree of suppression regardless of the talking volume of the other subscriber. On the other hand, should the subscriber at terminal W, for example, develop a higher than normal level at $W_T$, the loss that subscriber E can introduce via variable impedance 15 is reduced accordingly.

The required limiting action is provided by compensating level control networks 17 and 37 connected respectively in receive circuits 13 and 33. If only one of the subscribers, for example, E, raises his voice, this output reaches control point $W_R$ at the selected limiter level only. Such a level reduces the output level of subscriber W to channel 16 as a result of differential suppressor action. In no event, however, is a normal input signal at $W_T$ reduced by an undue amount. Thus, even under these conditions, partial double talking is assured regardless of the signal level reaching the input of 17 from station E. Under unfavorable noise conditions, however, such a restriction on the speech levels transmitted to the connecting circuits 10 and 30 is not desirable.

Accordingly, to permit appreciably stronger signals to pass to connecting circuits 10 and 30 during noisy periods of transmission, for example, notwithstanding the limiting action of the level control networks in the receive circuits, it is in accordance with the invention to increase the effective maximum output of level control networks 17 and 37 (shift the limiting level upward) as a function of noise level without changing the over-all gain of the system. Such a compensating gain adjustment maintains an essentially constant over-all voltage gain between the input and the output of the level control network and yet increases the power delivering capacity of the system to the circuits beyond. For example, in the absence of noise, the highest permissible level at point $W_R$ at the west station is fixed by the limiting action of control network 17 at a predetermined level regardless of the absolute level of signals received from subscriber E. In the presence of noise at either $W_T$ or $W_R$, on the other hand, a signal is developed at point $P_W$ by Nogad 22 (noise operated gain adjusting device) and is utilized to shift the limiting level of the control network 17 upward. Subsequently, an above normal level speech signal reaching network 17 is passed at the above normal level to point $W_R$. It is, of course, limited to the new level should it increase further, and the action previously described then takes place on the basis of the new, higher, limiting level. Nogad signals are also used, in the usual fashion, to adjust variable impedances 19 and 21 (and similar signals from Nogad 42 at station E adjust variable impedances 39 and 41) associated with differential control network 20 (and 40).

Figure 2:
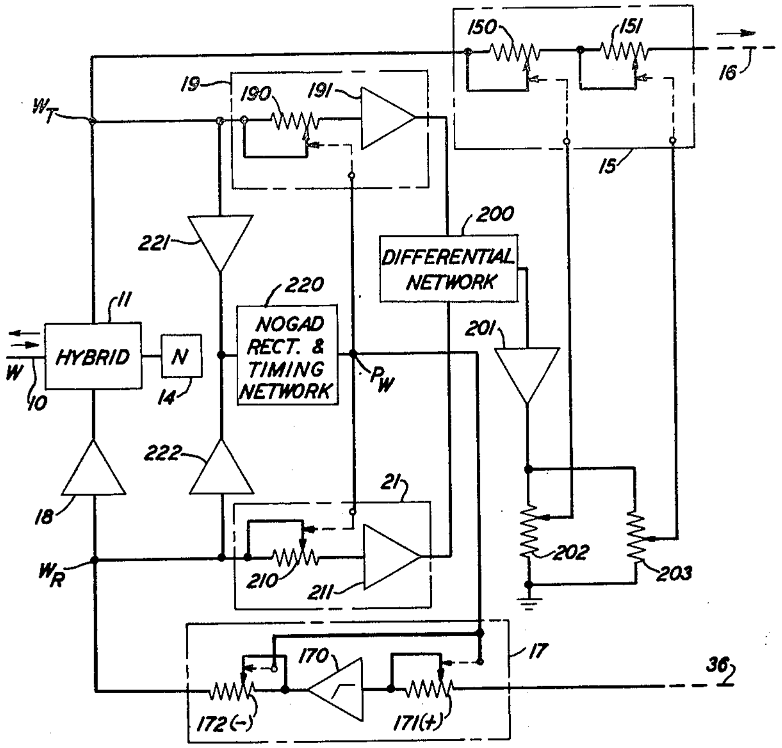
FIG. 2 is a diagram, partially in block schematic form, showing structural details of a portion of a system of FIG. 1.

FIG. 2 shows the structural details of the various elements used at one substation, e.g., the west station, of the system of FIG. 1. In a preferred construction, the compensating level control network 17 includes limiter amplifier 170, of any well known construction, and a pair of inversely controlled variolossers 171 and 172. The (+) notation indicates that as the noise level increases, the insertion loss of variolosser 171 increases, and the (−) notation indicates that for an increase in noise level, the insertion loss of variolosser 172 decreases. Both variolossers are responsive to the magnitude of the signal developed at point $P_W$ by Nogad 220.

Figure 3:
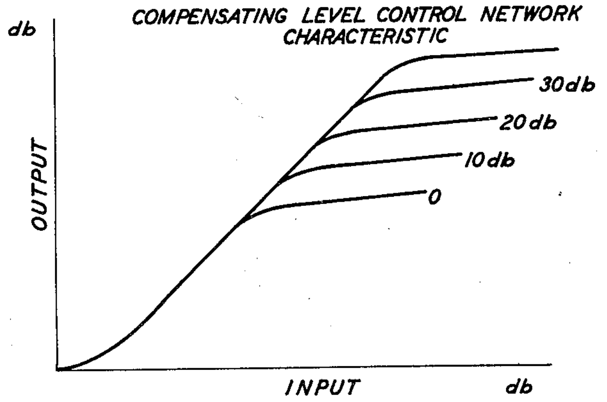
FIG. 3 shows the output characteristic of a typical compensating level adjusting device used in the practice of the invention.

The curves of FIG. 3 illustrate the input-output characteristic of control network 17. Below a normal limiting level, designated 0 db in the figure, the output linearly follows the input. As applied signals reach or exceed the normal limiting level the output remains substantially constant despite further increases in the input. In the presence of noise, however, variolossers 171 and 172 are simultaneously adjusted to shift the limiting level upward, for example, to the 10, 20, 30 db or intermediate levels as indicated in FIG. 3. So long as noise persists, input signals thus pass level control network 17 at the higher power level. It is to be noted, however, that the voltage gain of the network remains constant because of the reciprocal action of the variolossers thus maintaining over-all gain adjustment of the suppressor system.

Figure 4:
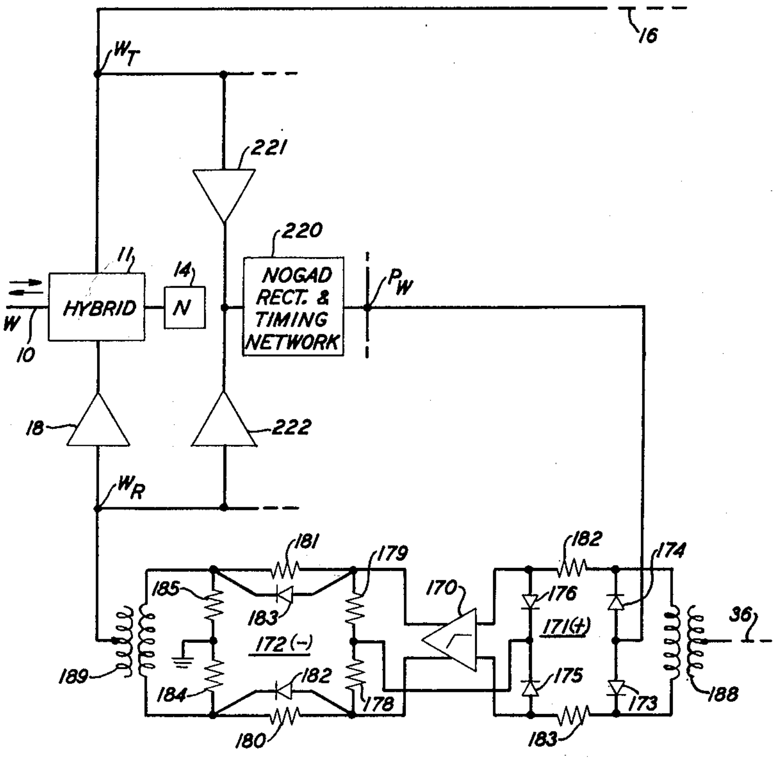
FIG. 4 is a diagram, partially in block schematic form, showing structural details of the compensating level adjusting device used in the practice of the invention.

FIG. 4 illustrates in greater detail the construction of compensating level control network 17. For simplicity, only that part of the circuit directly applicable to the control network is shown in detail. A noise signal, which reaches Nogad 220 from either $W_R$ or $W_T$ or partially from both, produces at point $P_W$ a D.-C. signal which is supplied to variolosser 171 at the junction of diodes 173 and 174. The effect of a D.-C. flow through the diodes of variolosser 171 is to provide a shunt path across the line which tends to short out the signal input to limiter amplifier 170, thus increasing the attenuation of variolosser 171. On the other hand, the direct current flow from the junction of diodes 175 and 176 of variolosser 171 to the junction of resistors 178 and 179 of variolosser 172 provides an alternate, lower impedance, path via diodes 182 and 183 around resistors 180 and 181 for the signal output of the limiter, thus decreasing the attenuation of variolosser 172. By proper selection of circuit constants, the inverse changes in attenuation are made essentially to nullify each other and to provide a constant voltage gain across the combination. In doing so, a smaller portion of the power output of limiter amplifier 170 is dissipated in variolosser 172 and, therefore, a greater portion is available at $W_R$. Since the output capacity of the limiter itself remains the same, the net result is an increase in the power delivering capacity of the combination. This increased capacity is utilized whenever a subscriber at terminal E raises his voice above normal in the presence of noise.

Returning again to a consideration of the apparatus of FIG. 2, voice signals or noise signals or both, which appear at points $W_R$ and $W_T$, are supplied by way of isolation amplifiers 221 and 222 to Nogad 220. Nogad 220, which preferably is of the sort described in U.S. Patent 1,814,018 of S. B. Wright and D. Mitchell, but which may be of any other desired construction, is virtually insensitive to voice frequency signals because of its slow build-up, quick-release, characteristic. It responds to steady noise, however, and by means of a rectifier or the like develops a D.-C. potential at point $P_W$ proportional to the noise level. This potential is used as described above to adjust the limiting level of network 17. It is also used to increase the loss in variable impedances 190 and 210, e.g., variolossers. This not only reduces the level of the noise signals which reach differential network 200 (a desired result), but also reduces the level of the speech signals applied to the network 200 from $W_R$ and $W_T$ as well. This reduces the attenuation of echo return for a given speech signal level at $W_R$. The decrease in over-all attenuation is counter-balanced, however, by the masking effect of the noise which reduces the amount of attenuation which must be supplied by variable impedance 15 for acceptable performance. If desired, amplifiers 191 and 211 may be connected in series with variolossers 190 and 210, respectively, to isolate the several units.

Differential network 200 supplies, by way of amplifier 201 and potentiometers 202 and 203, the necessary control signals for variable impedance 15. Preferably, in accordance with the invention, variable impedance 15 is arranged to exhibit a highly nonlinear transfer characteristic with an approximately linear characteristic over the first part of the suppression range, and a rapidly increasing loss over the remainder of the range. The former provides for differential comparison of comparable levels arriving simultaneously, taking into account transmission delay time, from both subscribers, and the latter for securing adequate suppression of echo return. In practice, the desired characteristic is obtained by means of two independently controlled variolossers 150 and 151 connected in tandem. Each may be of the sort illustrated at 171 in FIG. 4. By suitably adjusting the level of the control signal supplied from differential network 200, e.g., by adjusting the wiper arms of potentiometers 202 and 203, one variolosser only responds to control currents below a pre-established threshold to provide substantially linear suppression as a function of input. Above this threshold, the second variolosser begins to insert loss. By proper selection of diode characteristics and adjustment of circuit constants, the loss above this point is inserted at a substantially faster rate than it is with the first variolosser acting alone. An illustrative characteristic that may be obtained with the tandem losser configuration is shown in FIG. 5. Others may, of course, be obtained by adjustment to meet specific needs.

The above-described arrangements are merely illustrative of the application of the principles of the invention. Numerous other arrangements may be devised by those skilled in the art without departing from the spirit and scope of the invention.

What is claimed is:

1. In a system for suppressing echoes in a two-way signaling circuit comprising incoming and outgoing one-way paths,
   - means at each terminal of said circuit for differentially responding to the amplitude of signals in both of said one-way paths,
   - means responsive to said differential response for smoothly altering the transmission efficiency of said outgoing path at a prescribed rate,
   - means for providing a measure of the noise level in said paths, and means connected in said incoming paths for controlling the maximum permissible level of incoming signals in response to said measure of noise level.

2. A system for suppressing echoes in a two-way signaling circuit comprising, in combination, incoming and outgoing one-way paths, means at one terminal of said circuit for differentially responding to the amplitude of signals in both of said one-way paths, means responsive to said differential response for smoothly altering the transmission efficiency of said outgoing path at a prescribed rate, means for providing a measure of the noise level in said paths, and means connected in said incoming path responsive to said measure of noise level for controlling the effectiveness of incoming signals in influencing said differential responding means.

3. The system for suppressing echoes in a two-way signaling circuit as defined in claim 2 wherein said means for controlling the effectiveness of incoming signals in influencing said differential responding means comprises, a first variolosser, a limiter amplifier, and a second variolosser connected in tandem in said incoming path, said first variolosser, supplied with incoming signals, exhibiting an increase in impedance to said incoming signals for an increase in detected circuit noise level, and said second variolosser, supplied with signals from said limiter amplifier, exhibiting a decrease in impedance to signals from said limiter for an increase in detected circuit noise level.

4. The system for suppressing echoes in a two-way signaling circuit as defined in claim 2 wherein said means for smoothly altering the transmission efficiency of said outgoing path at a prescribed rate comprises, a first and a second variolosser connected in tandem in said outgoing path, and means supplied with signals from said differentially responding means for actuating each one of said variolossers independently at a prescribed rate, whereby one of said variolossers exhibits a relatively slow loss rate with input signal and the other of said variolossers exhibits a relatively fast loss rate with input signal.

5. An echo suppressor circuit for a voice communication system comprising, adjustable means connected in the first, outgoing, of two one-way paths for altering the transmission efficiency of said first path, means connected to both of said paths for providing an electrical indication of the relative strength of signals in the first and second one-way paths of said system, means responsive to said electrical indication for controlling said adjustable means, means connected in the second, incoming, of said paths for preventing the level of incoming signals from exceeding a prescribed maximum level, means for detecting the level of noise in said incoming and outgoing paths, and means in circuit relation with said detection means responsive to said detected level of noise for altering said prescribed maximum level.

6. An echo suppressor circuit for the terminal station of a long distance voice communication system including incoming and outgoing one-way transmission paths, comprising, in combination, means for directing substantially all voice signal energy from said incoming one-way path to a two-way transmission path and for directing substantially all voice signal energy from said two-way path to said outgoing one-way path, a variable impedance in said outgoing one-way path, means responsive to voice signals in said incoming and said outgoing paths for controlling the impedance of said variable impedance, a level control network in said incoming one-way path for establishing the maximum permissible level at which incoming signals reach said directing means, means in circuit relation with said level control network for compensating for the effect of noise signals in said incoming and outgoing paths on said voice signals, said compensating means comprising variable impedance means responsive to said noise signals for altering the maximum signal level passed by said level control network without affecting the transmission efficiency of said level control network.

References Cited in the file of this patent

UNITED STATES PATENTS 2,852,621 Ryall ------------------ Sept. 16, 1958